US 11,408,398 B2

(12) United States Patent
Grove et al.

(10) Patent No.: US 11,408,398 B2
(45) Date of Patent: Aug. 9, 2022

(54) CONFIGURATION OF WIND TURBINE CONTROLLERS

(71) Applicant: VESTAS WIND SYSTEMS A/S, Aarhus N (DK)

(72) Inventors: Peter Delgado Grove, Hinnerup (DK); David Steele, Skanderborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 137 days.

(21) Appl. No.: 16/770,050

(22) PCT Filed: Dec. 3, 2018

(86) PCT No.: PCT/DK2018/050317
§ 371 (c)(1),
(2) Date: Jun. 4, 2020

(87) PCT Pub. No.: WO2019/110062
PCT Pub. Date: Jun. 13, 2019

(65) Prior Publication Data
US 2020/0291924 A1    Sep. 17, 2020

(51) Int. Cl.
*F03D 13/30* (2016.01)
*F03D 7/04* (2006.01)
(Continued)

(52) U.S. Cl.
CPC ........... *F03D 13/30* (2016.05); *F03D 7/0264* (2013.01); *F03D 7/04* (2013.01); *F03D 7/047* (2013.01); *G05B 15/02* (2013.01)

(58) Field of Classification Search
CPC .......... F03D 13/30; F03D 7/0264; F03D 7/04; F03D 7/047; G05B 15/02; F05B 2230/80; Y02E 10/72; Y02P 70/50
See application file for complete search history.

(56) References Cited

U.S. PATENT DOCUMENTS

| 5,936,529 A | 8/1999 | Reisman et al. |
| 2008/0101916 A1 | 5/2008 | Calley |

(Continued)

FOREIGN PATENT DOCUMENTS

| CA | 2970329 A1 | 7/2016 |
| CN | 107179723 A | 9/2017 |

(Continued)

OTHER PUBLICATIONS

PCT International Search Report for Application No. PCT/DK2018/050317 dated Feb. 27, 2019.

(Continued)

Primary Examiner — Charles R Kasenge
(74) Attorney, Agent, or Firm — Patterson + Sheridan, LLP

(57) ABSTRACT

The wind turbine comprises at least one controller arranged to control a function of the wind turbine, and a data storage unit arranged to store controller specific data for the at least one controller, where the data storage unit is associated with the at least one controller to enable communication of the controller specific data between the data storage unit and the at least one controller. The method comprises detecting a connection between a programming enabling key and a connection interface dependent on a presence of the programming enabling key in proximity of the connection interface, initiating a programming mode wherein a control unit is enabled to receive controller specific data or wind turbine specific data from which the controller specific data can be determined, and obtaining the controller specific data or the wind turbine specific data via a manual action or via a trusted data source.

17 Claims, 3 Drawing Sheets

(51) Int. Cl.
*F03D 7/02* (2006.01)
*G05B 15/02* (2006.01)

(56) References Cited

U.S. PATENT DOCUMENTS

| | | | | |
|---|---|---|---|---|
| 2010/0133822 | A1 | 6/2010 | Mixter, Jr. | |
| 2011/0049887 | A1* | 3/2011 | Milo | G05B 19/042 |
| | | | | 290/44 |
| 2011/0204631 | A1* | 8/2011 | Minami | F03D 80/50 |
| | | | | 290/44 |
| 2011/0298213 | A1* | 12/2011 | Minami | F03D 7/047 |
| | | | | 290/44 |
| 2015/0078894 | A1* | 3/2015 | Chan | F03D 7/0276 |
| | | | | 416/1 |
| 2016/0327025 | A1 | 11/2016 | Noto | |

FOREIGN PATENT DOCUMENTS

| | | |
|---|---|---|
| EP | 2216548 A2 | 8/2010 |
| GB | 2545719 A | 6/2017 |
| WO | 2013182197 A1 | 12/2013 |
| WO | 2014153673 A1 | 10/2014 |
| WO | 2014173448 A1 | 10/2014 |
| WO | 2019110062 A1 | 6/2019 |

OTHER PUBLICATIONS

PCT Written Opinion of the International Searching Authority for Application No. PCT/DK2018/050317.
Danish Patent and Trademark Office 1st Technical Examination for Application No. PA 2017 70912 dated Apr. 24, 2018.

* cited by examiner

CONFIGURATION OF WIND TURBINE CONTROLLERS

FIELD OF THE INVENTION

The present invention relates to wind turbines, particularly to a method for setting up control systems of the wind turbine, e.g. in connection with commissioning.

BACKGROUND OF THE INVENTION

A wind turbine is a highly complex computer controlled system which normally comprises several controllers arranged to control functions of the wind turbine. The controllers comprise computer devices which processes computer programs in order to carry of the functions.

At the same time, a manufacturer of wind turbines may have several different wind turbine types and different configurations of each type. Each different wind turbine may require different computer programs or the computer programs may need to be set up differently in order to ensure correct control of the wind turbine functions.

Incorrect settings of the controllers may lead to unsatisfactory performance or critical situation which may even lead to break down of wind turbine components.

The requirement of correct configuration of controllers may arise both in connection with commissioning and after commissioning, e.g. in connection repairs or upgrades.

Due to the possibly large number of different wind turbine types, the configuration of controllers, e.g. programming of controllers, may be time consuming, complex and may increase the risk of incorrect configurations.

Due to the potential risk of severe damages or personal injuries the procedure of setting up wind turbines may need to meet standardized requirements such as governance requirements.

Accordingly, it is a challenge that different types of wind turbines require different configurations. Therefore, there is a need for a method which ensures reliable, safe and simple set-up of wind turbine controllers.

WO2013/182197 A1 discloses a control system for a wind turbine which includes a plurality of controllers distributed in the wind turbine or the wind power plant, and a plurality of data storage units, each data storage unit being arranged at a respective predetermined position in the wind turbine or the wind power plant and being coupled to the controller arranged at the same position, wherein each data storage unit comprises operational information pertaining to the predetermined position in the wind turbine or the wind power plant, and wherein each controller is configured to read the operational information of the corresponding data storage unit and to determine its function from the operational information.

WO2013/182197 A1 discloses a method for improving set-up of wind turbine controllers. However, the inventors of the present invention has appreciated that an improved solution is of benefit, and has in consequence devised the present invention.

SUMMARY OF THE INVENTION

It is an object of the invention to improve wind turbines such as improving methods for configuring the wind turbine or wind turbine controllers such as configuring programmable or electronic controllers. Particularly, there is a need for a configuration method which provides reliable, safe and simple configuration of wind turbine controllers.

In a first aspect of the invention there is provided a control system for a wind turbine, the wind turbine comprises at least one controller arranged to control a function of the wind turbine, and a data storage unit arranged to store controller specific data for the at least one controller, where the data storage unit is associated with the at least one controller to enable communication of the controller specific data between the data storage unit and the at least one controller, the control system comprises:
- a connection interface arranged to connect with a programming enabling key dependent on a presence of the programming enabling key in proximity of the connection interface,
- a control unit arranged to detect the connection between the programming enabling key and connection interface, and in response to the detection, to initiate a programming mode wherein the control unit is enabled to receive controller specific data or wind turbine specific data from which the controller specific data can be determined.

A control system comprising both the at least one controller, the data storage unit, the connection interface and the control unit may similarly be envisaged.

The wind turbine may comprise a single controller or a plurality of controllers arranged to control a function or several functions of the wind turbine. Such functions may include, yaw control, pitch control, lubrication control, monitoring of temperatures such as lubrication oil, generator and power converter temperatures as well as several other functions. A single controller may support several functions, or several functions may supported by a plurality of controllers.

The data storage unit stores controller specific data for the at least one controller. The controller specific data may comprise operational parameters which are required for processing of controller specific computer programs installed in the at least one of controller. For example, such parameters may include threshold values, temperature limits, data which defines the wind turbine blades, e.g. lengths, other parameters required for controlling functions of the wind turbine. Accordingly, the functions to be performed by the at least one controller may include different functions. For example, a first controller may be dedicated to perform a first function and a second controller may be dedicated to perform a second function.

The wind turbine may comprise one or more data storage units for storing the controller specific data. One data storage unit may store data for a plurality of controllers or for a plurality of functions supported by the at least one controller. Similarly, a plurality of data storage units may store for a plurality of controllers or for a plurality of functions supported by the at least one controller. Thus, a plurality of data storage units may store data used by a single controller.

The data storage unit, or a plurality of data storage units, is/are associated with the at least one controller to enable communication of data. That is, a data storage unit is communicatively associated with the at least one controller so that data can be communicated to and/or from the data storage unit to the controller. The data storage units may be a detachable data storage units and/or one or more of the data storage units may be comprised by the controllers. For example, the data storage unit may be configured as a memory stick which can be connected with an associated controller, directly or via an electrical connector, cables or electronic circuits. In general the data storage units are enabled to be communicatively connected to receive and/or transmit data via electrical connections (e.g. wired and/or via electrical connectors), optical connections (e.g. via optical connectors and/or optical fibres), wirelessly connected (e.g. via RF communication or optical connection). Alternatively, one or more of the data storage units may be integrated with the controllers, e.g. as an electronic memory which is dedicated for storage of the controller specific data.

The connection interface may be configured in various ways; examples include a socket arranged to connect mechanically and e.g. electrically, magnetically or optically with the programming enabling key and the wireless connection interface. The electrical connection may include a switch or other electrical connection such as a connection between electrical connectors between the socket and the programming enabling key. A wireless connection interface may be based on Radio-frequency communication like RFID technologies, electromagnetic induction, or magnetic connection such as reed switches.

The programming enabling key is compatible with the connection interface and supports the connection method described above or other method. For example, the programming enabling key include an electrical conducting part which establishes a detectable electrical connection between pins of the socket when the programming enabling key is inserted.

The programming enabling key may be a dongle, i.e. a device which is connectable with the connection interface to provide the functionality in terms of the detectable connection.

The connection requires a presence of the programming enabling key. The presence may be established by a contact between the contact interface and the programming enabling key such as an electrical, magnetical or optical contact. Alternatively, the presence may be satisfied when the programming enabling key in close proximity to the connection interface, e.g. as required by wireless radio-frequency identification technologies such as RFID methods.

The presence requirement may provide an additional reduction to the risk of incorrect initiation of entering a programming mode and/or the risk of providing incorrect controller-specific data. This could happen if a connection between the connection interface and the programming enabling were established with means which did not require physical presence or physical proximity. For example, if it were possible to use a connection interface operating as a virtual interface such as a computer implemented interface in the control unit, a connection via this virtual interface could be established at a distance, e.g. via Internet connections to the programming enabling computer, which may or may not also be restricted by access codes to control what data gets programmed via the program enabling key. Regardless of whether this connection is correctly established and the data entered correctly, the non-presence of a human near the wind turbine increases the risk that wrong controller specific data or wind turbine specific data is provided to the control unit, e.g. as a consequence of details of the wind turbine's configuration not being visible for the person who is responsible for providing the controller specific data and/or wind turbine specific data The control unit may be comprised by the at least one controller of the wind turbine, or the control unit may be different from the at least one controller. In response to a detected connection, the control unit initiate a programming mode wherein the control unit is enabled to receive controller specific data or wind turbine specific data from which the controller specific data can be determined.

The control unit is advantageously a single control unit which comprises a digital processer or computer arranged to process the detection of the contact and the programming mode. However, the control unit could also include distributed controllers and computers. The control unit is preferably a safety controller in the sense that it is designed for high-reliability in its ability to provide safety functionality which dramatically reduce the risk to both humans and the turbine itself. Such a safety controller also has the properties of failing to a safe state in the event of failure, e.g. internal failures of the processor or other controller elements.

Advantageously, the programming mode is carried out at the location of the wind turbine. In this way, the at least one controller or data storage unit(s) need not store any controller or wind turbine specific data. Instead the data specifically required by the at least one controller can be provided at the time the wind turbine is commissioned. This simplifies the production and reduces the risk for incorrect wind turbine configurations.

According to an embodiment, the control unit is arranged to process the controller specific data or wind turbine specific data so that the controller specific data or wind turbine specific data is stored in the storage unit. During the programming mode or after the programming mode, the control unit is responsible for communicating the specific data so that they are stored in the storage unit or the plurality of data storage units. The processing may involve communicating the data to the at least one controller which transmits the received data to the data storage unit.

Advantageously, the control unit may be configured to process the controller specific data or wind turbine specific data, including transmission to the at least one controller or data storage unit, while the programming enabling key is in engagement with the connection interface, possibly after completion of the receipt of all specific data. By requiring that the programming be completed while the program enabling key is engaged and immediately changing operational modes upon enabling or disabling of the programming enabling key, full isolation between the programming state and the operational state are assured. If programming were only queued or merely started and the programming enabling key were disengaged, this would open the possibility that parameters accessible for change while in programming mode could be changed at some arbitrary point in time, creating uncertainty in the state of the safety-critical system.

Additionally, the lack of isolation between the programming and operational states would greatly increase the risk that a software error in the programming functions of the control unit or other controllers could cause unintended and potentially dangerous reprogramming.

According to an embodiment, the connection interface is arranged to connect with the programming enabling key dependent on a contact and/or wireless communication between the programming enabling key and the connection interface.

The control unit may be configured so that the contact and/or wireless communication enables detection of the connection. Accordingly, at least the presence of the programming enabling key in proximity of the connection interface may be required to initiate the programming state. Advantageously, this limits risks for unintended initiations of the programming mode by requiring presence of a user.

According to an embodiment, the control unit controller comprises a user interface or is connectable with a user interface, where the user interface is arranged to receive the controller specific data or the wind turbine specific data via a manual action. The manual action may comprise manual entering of data or other human-computer interaction for the purpose of providing controller specific data or the wind turbine specific data to the control unit.

According to an embodiment, the control unit comprises a data interface or is connectable with a data interface, where the data interface is arranged to receive the controller specific data or the wind turbine specific data via a connection with a trusted data source. The trusted data source may be a computer device or electronic processing or storage device which has previously been security checked. For example, the trusted data source may be memory stick which is able to connect with the data interface and to transmit controller specific data or the wind turbine specific data to the to the control unit via the data interface. The trusted data source could also be server or computer device located remote from the wind turbine, where the stored controller specific data or the wind turbine specific data has been verified and may only be communicated to the data interface in response to entering a password or via other manual acceptance.

The control unit may be configured both with the user interface or to be connectable with a user interface as well as the with the data interface or to be connectable with a data interface so that the user has both possibilities for providing data to the control unit.

Advantageously, the user interface improves security and reduces the risk that incorrect data is received by the control unit. For example, the user data entered into the user interface may be double checked, e.g. by a different person, to ensure that data it correct. In the same way, the data comprised by the trusted data source may have been verified manually to ensure high security.

The control unit may advantageously be configured so that the communication of data from the user interface or data interface is only allowed at least after the detection of the connection between the connection interface and the programming enabling key has been established, and possibly only when the connection is continuously detected.

According to an embodiment the control unit is configured to be set to a pre-programming mode which enables the control unit to detect the connection with the programming enabling key. For example, a password may be required via a user-interface associated with the control unit to initiate the pre-programming mode.

According to an embodiment, the control unit is arranged to bring the wind turbine into a safe mode when the control unit is in the pre-programming mode. E.g. in response to initiating the pre-programming mode, the wind turbine may be brought into the safe mode, if wind turbine is not already in a safe-mode. The safe mode may include shutting down all active systems such as heating systems, power converters, various actuator systems such as the pitch and yaw systems. The safe mode, may include an initial step of prohibiting rotation of the rotor, e.g. by pitching the blades into a feathered position.

According to an embodiment, the data storage unit is configured as a detachable data storage unit so that the communication of data between the data storage unit and the at least one controller is only possible when the data storage unit is connected with the at least one controller. Advantageously, the at least one controller can be replaced, e.g. in connection with planed service replacements or repairs, without replacing the data storage unit when the data storage units are detachable units. In this way, a new configuration of the data storage units with controller or wind turbine specific data may not be required. By storing identification data, the data storage units are location specific, i.e. associated with a specific location of the wind turbine or a specific controller. Furthermore, since the data storage unit may store identification data which defines the function of the associated controller, the replaced controller can be a generic controller which is programmed after installation in the wind turbine controller on basis of the location specific data. Accordingly, the same generic controller may be used for controlling different functions of the wind turbine.

According to an embodiment, the controller specific data comprises operational parameters which are required for processing of controller specific computer programs installed in the at least one of controller. The controller specific computer programs are computer programs or algorithms which comprise computer instructions required for the controller for performing the intended function. In order to perform the correct function for a given wind turbine configuration, the controller specific computer program uses the controller specific data, or possibly the wind turbine specific data.

According to an embodiment, the control unit is arranged to communicate controller specific computer programs to the at least one controller before the control unit it enabled to initiate the programming mode. The installation of the controller specific computer programs may be performed independently of the presence of the programming enabling key since the computer programs are generic programs, i.e. the same programs are used for different wind turbine configurations. The installation of the controller specific computer programs may be performed on basis of the identification data stored in the data storage unit. For example, the identification data may be a unique identifier for the computer program package intended for installation on the controller associated with the data storage unit storing the unique location specific data.

Thus, according to an embodiment, the control unit is arranged to communicate the controller specific computer programs to the at least one controller dependent on the identification data pre-stored in the data storage unit.

According to an embodiment, the control system according to any of the preceding claims, wherein the wind turbine comprises a plurality of the data storage units, where each data storage unit is associated with a specific controller of the at least one controller to enable communication of the controller specific data between the associated data storage unit and the specific controller.

According to an embodiment, the control unit is arranged to stop the programming mode and initiate a safety mode in case the control unit detects disconnection of the programming enabling key before completion of the programming mode. Accordingly, intended or unintended removal of the programming enabling key immediately stops the programming of the control unit with controller or wind turbine specific data and allows normal safety functions to restart after a reboot process. The reboot process may involve reboot of the at least one controller which is/are being programmed as a consequence of the contact with programming enabling key, or generally reboot the at least one controller and potentially other affected controllers.

A second aspect of the invention relates to a wind turbine comprising,
  at least one controller arranged to control a function of the wind turbine,
  a data storage unit arranged to store controller specific data for the at least one controller, where the data storage unit is associated with the at least one controller to enable communication of the controller specific data between the data storage unit and the at least one controller, and a control system according to the first aspect.

According to an embodiment, each data storage unit is physically connected to a specific location of the wind turbine. For example, each data storage unit may physically connected to a location associated with the controller of which it is associated. For example, a data storage unit may be attached by a wire or similar to a location near the associated controller or near a location comprising e.g. a connector for the data storage unit, where the connection is communicatively connected, wired or wireless, to the associated controller. In this way, it is ensured that the data storage unit is not mixed with other data storage unit or that the data storage unit is lost.

A third aspect of the invention relates to a method for configuring a wind turbine, the wind turbine comprises at least one controller arranged to control a function of the wind turbine, and a data storage unit arranged to store controller specific data for the at least one controller, where the data storage unit is associated with the at least one controller to enable communication of the controller specific data between the data storage unit and the at least one controller, the method comprises

- detecting a connection between a programming enabling and a connection interface dependent on a presence of the programming enabling key in proximity of the connection interface,
- in response to the detection, initiating a programming mode wherein the control unit is enabled to receive controller specific data or wind turbine specific data from which the controller specific data can be determined, and
- obtaining the controller specific data or the wind turbine specific data via a manual action or via a trusted data source.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
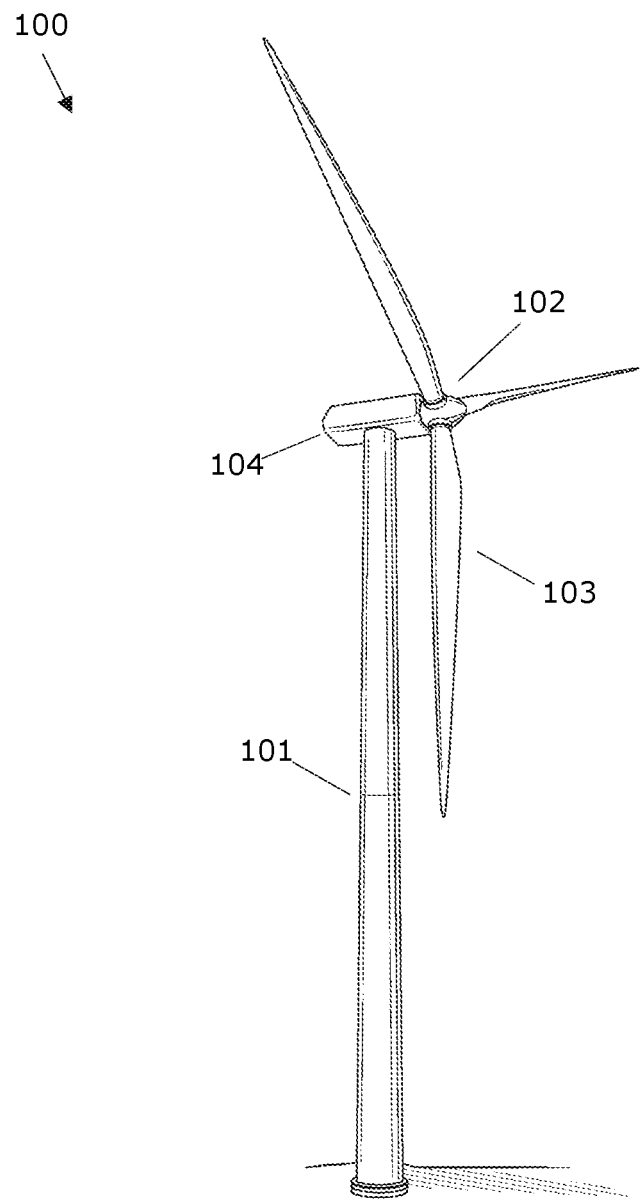
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator may be connected with a power converter which may be configured as a combination of a converter and a grid inverter. The converter converts the generator AC power into DC power and the grid inverter converts the DC power into an AC power for injection into the utility grid via an output power terminal of the wind turbine 100.

Figure 2:
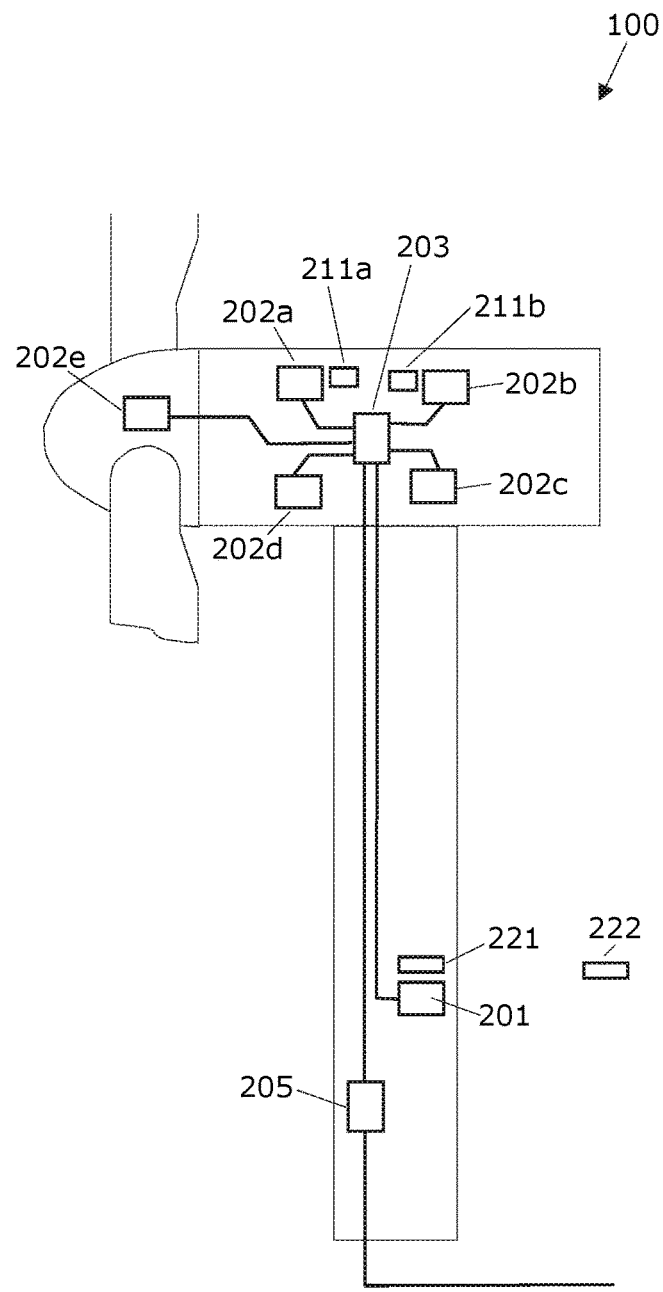
FIG. 2 shows a wind turbine with a plurality of controllers, a plurality of data storage units, a control unit, and a computer network and data switches which connects the controllers.

FIG. 2 shows wind turbine 100 which comprises a plurality of controllers 202a-e arranged to control a function of the wind turbine and a plurality of data storage units 211a-b arranged to store controller specific data. The data storage units are associated with the at least one controller in a way so that the controller specific data and other data can be communicated between a data storage unit 211a-b and one or more controllers 202a-e associated with the data storage unit 211a-b. The communication of data can be used for reading and/or writing data to the data storage units 211a-b.

Each specific controller 202a-e may have a specific data storage unit 211a-b. For example a first controller 202a may have an associated storage unit 211a, and so forth.

The data storage units 211a-b may be memory sticks and each controller 202 may have a connector for connecting to a data storage unit. The connector could be integrated with the controller 202 or wire-connected to the controller 202. However, connections between data storage units 211 and controllers may be based on other connection methods including wireless connections, e.g. based on RF communication, optical communication and other data communication methods.

The data storage units 211a-b may be physically connected to a location of the wind turbine, e.g. locations which are associated with pre-stored identification data stored in the data storage units, where the pre-stored identification data defines which function of a controller 202a-e the data storage unit is associated with.

The controllers 202 are used for controlling functions of the wind turbine such as pitch control, yaw control, monitoring of operational parameters such as temperature. A single controller 202 may be dedicated for a specific function, e.g. pitch control, or gear-box oil temperature monitoring. Alternatively, a single controller can perform several functions and possibly different functions of the wind turbine. In principle a single controller, which may comprise a plurality of digital data processors or computing devices, can be used for controlling and monitoring all or substantially all functions of the wind turbine.

The controllers 202, which essentially are computing devices, are configured to process controller specific computer programs, i.e. software, installed on the controllers 202. The controller specific computer programs comprise algorithms required for performing the control or monitoring of a given function of the wind turbine.

The controller specific computer programs may be generic programs which may be configured for a specific function, e.g. pitch control, but for different wind turbine configurations. Different wind turbine configurations may include wind turbines configured with different types of blades 103 or other different generator types.

The controller specific data stored in the data storage units 211 are used by the generic computer programs to perform correct control or monitoring of a function according to a specific wind turbine configuration. The controller specific data includes data relating to specific configurations of the wind turbine such as lengths of the rotor blades 103.

The wind turbine further comprises a control unit 201 communicatively connected with a connection interface 221. The connection interface 221 is arranged to connect with a programming enabling key 222.

A function of the control unit 201 is to detect if the programming enabling key 222 is connected with the connection interface 221 and if such a connection is detected to initiate a programming mode wherein the control unit 201 is enabled to receive controller specific data.

As an example, the connection interface 221 may comprise a connection socket, such as an electrical socket. The programming enabling key 222 may be connection plug, such as an electrical plug, which matches the connection socket. The connection socket and plugs are arranged so that it is possible to detect when the plug is inserted. For example, the plug may be configured to establish an electrical connection between two pins of the socket. The control unit 201 can be configured to monitor these two pins to detect an electrical connections and thereby the connection between the connection interface 221 and the program enabling key 222.

Clearly, the connection interface 221 and the programming enabling key 222 may be configured in various ways. Examples include wireless connections where the connection interface is able to detect via radio-frequency-detection the presence of the programming enabling key when it is near the connection interface 221. Technologies for such detectable wireless connection include RFID technologies.

In general, the connection interface 221 and the programming enabling key 222 utilizes a connection technology which enables detection, by the control unit 201, of the presence of the programming enabling key 222 in proximity of the connection interface. Thus, the presence of the programming enabling key 222 requires a contact between the programming enabling key 222 and the connection interface 221 or that the programming enabling key is near the connection interface 221, e.g. within 1 meter.

The control unit 201 is arranged to initiate a programming mode in response to a detected contact between the programming enabling key 222 and the connector 221. The programming mode enables the control unit 201 to receive controller specific data.

The controller specific data may be received in different ways, for example from a user interface. The user interface may comprise a keyboard connected or connectable with the control unit 201. The controller specific data may be entered via a manual action via the keyboard and transmitted to the control unit 201.

In another example, the controller specific data is received from a trusted data source which is connected or connectable to the control unit 201, e.g. via a data interface. The trusted data source includes the verified controller specific data. The trusted data source may be a detachable data source connected to the control unit 201 via a cable or a remote data source connected with e.g. the Internet.

Clearly, other data than controller specific data could be received by the control unit 201 in response to a detected connection between the programming enabling key 222 and the contract interface 221. Such other data could be wind turbine specific data which identifies a specific wind turbine configuration, e.g. in terms of a wind turbine specific number. The control unit 201, each or one or more of the controllers 202a-e, or other computer device may store a table of controller specific data for one or more specific wind turbine configurations and wind turbine specific data associated with these configurations. By use of the table, the controller specific data can be determined based on the wind turbine specific data, e.g. by the control unit 201, based on a table stored in a memory of the control unit 201 or stored elsewhere in another computer devise or data storage. Alternatively, the each of the controllers 202a-e may be configured to retrieve the controller specific data from a stored table based on the received wind turbine specific data.

After the controller specific data is received, i.e. data required by all controllers 202a-e and possibly the control unit 201, the control unit 201 processes the controller specific data so that the controller specific data are transmitted to the storage units 211a-b where the data are stored.

For example, the controller specific data temporarily stored in the control unit 201 may be transmitted to the data storage units 211a-b by sending the data via a data communication switch 203 to the distributed controllers 202a-e. Controller specific data intended for a specific controller 202a-e may include address information of the specific controller so that the data is only sent to the intended controller 202a-e. The distributed controllers 202a-e may be configured to transmit the received controller specific data to the one or more associated data storage units 202a-e, and possibly to extract relevant controller specific data from a data package comprising all controller specific data.

The control unit 201 may need to be in a particular mode before it is enabled to detect the connection with the programming enabling key 222. For example, the control unit 201 may be set into a pre-programming mode where the control unit monitors the connection interface 221 for a possible connection with programming enabling key 222. The setting of the control unit 201 into the pre-programming mode may trigger a safe mode of the wind turbine where various system of the wind turbine are shut down or brought into a suitable state. The pre-programming mode may trigger a waiting mode of the controllers 202 where they await the controller specific data from the control unit 201.

The plurality of controllers 202a-e may have the same hard-ware configuration, i.e. so that the controllers 202a-e are identical or substantially identical. In this way, production of wind turbines 100 are simplified and the production stock can be kept smaller. Furthermore, by use of detachable data storage units 211a-b, the controllers 202a-e can be replaced without replacement of the associated data storage units 211a-b. When the data storage units 211a-b are detachable units such as memory sticks, the full function of the associated controllers 202a-e is only available when the one or more data storage units 211a-b are connected with the one or more controller 202a-e.

The data storage units 211a-b may contain pre-stored identification data. The identification data is stored in the data storage units, e.g. at a production or assembly facility. In order to be able to determine the identity of a data storage unit in other ways, e.g. by visual inspection during commissioning of the wind turbine, the data storage units 211a-b may be provided with specific colors barcodes which are uniquely associated with the pre-stored identification data.

The identity and pre-stored identification data of the data storage units 211a-b can be used to determine the intended function a specific data storage unit 211a-b and its associated controller 202a-e. For example, when the data storage units 211a-b and the associated controllers 202a-e are installed in the wind turbine and appropriately connected, the control unit 201 or other computer device connected with the control unit 201, may be able to obtain the pre-stored identification data, e.g. through a request sent to the controllers 202a-e. By use of the obtained identification data, the controller unit 201 is able to determine what controller specific data should be communicated to each of the data storage unit 211a-b. Alternatively, each of the controllers 202a-e are able to determine what controller specific data should be communicated to each of the data storage unit 211a-b, in case the controllers 202a-e are responsible for extracting controller specific data from e.g. a data package of all controller specific data sent from the control unit 201.

Since the pre-stored identification data identifies the intended function of an associated controller 202a-e, the pre-stored identification data may additionally be used for determining which computer programs should be installed on the controllers 202a-e. Accordingly, the controller specific computer programs can be installed on the controllers 202a-e based on the pre-stored identification data. For example, the control unit 201 may be arranged to communicate the controller specific computer programs to the one or more controllers 202a-e. The correct computer program for a given controller 202a-e can be determined by sending a request from the control unit 201, or from other computer device responsible for installing computer programs, to the controllers 202a-e to reply with the identification data stored in the associated data storage unit 211a-b to the requesting device. The control unit 201 or other computer device responsible for installing computer programs may store a table with links between different pre-stored identification data and controller specific computer programs.

The communication and installation of computer programs may be performed before the control unit 201 is enabled to initiate the programming mode, i.e. before receipt of controller specific data. The communication of computer programs before communication of the controller specific data may be advantageous, since the installed computer programs may contain function for supporting the storage of controller specific data.

The wind turbine also may comprise a data communication switch 205 which may comprise a data input port connected to an external network such as the Internet. The data communication switch 205 may be used for accessing externally stored data such as tables or databases containing wind turbine and controller specific data and their associations or links, databases containing controller specific computer programs. The data communication switch 205 may also be used for accessing trusted data sources for retrieval of controller specific data or wind turbine specific data in response to a detected connection with the programming enabling key 222.

In case the programming enabling key 222 is accidentally removed or in case the connection between the programming enabling key 222 and the contact interface 221 is lost for some reason during an in-completed programming mode, the control unit 201 may be arranged to stop the programming mode and initiate a safety mode. The safety mode may restart the pre-programming mode so that a new programming mode can be started or may cause the control unit 201 to start other relevant procedure.

The control unit 201 may be connected with a computer device (not illustrated) which supports functions of the control unit 201 or supplements the control unit 201 with functions not carried out by the control unit 201. For example, the running of the function of the user interface 302 may be fully or partially supported by such computer device.

Figure 3A:
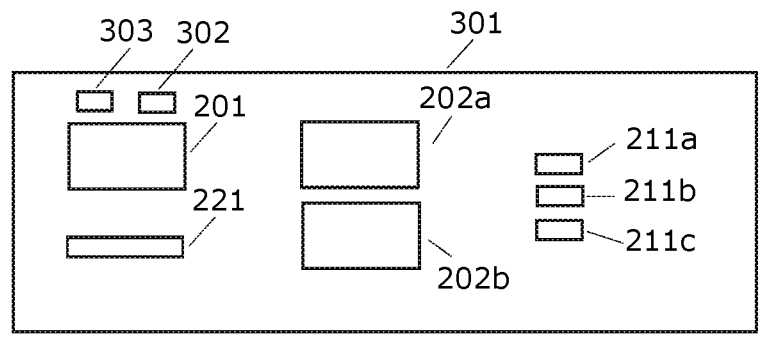
FIG. 3A shows a control system comprised the by wind turbine.

FIG. 3A illustrates a control system 301 which comprises the connection interface 221 and the control unit 201. Additionally, the control system 301 may comprise the one or more of the controllers 202a-e and one or more data storage units 211a-c. FIG. 3A further illustrates a user interface 302 connectable with or comprised by the control unit 201 or other computer device (not shown) of the control system 301. A data interface 303 used as an alternative to the user interface 302 or supplementing the user interface 302 is also shown.

Figure 3B:
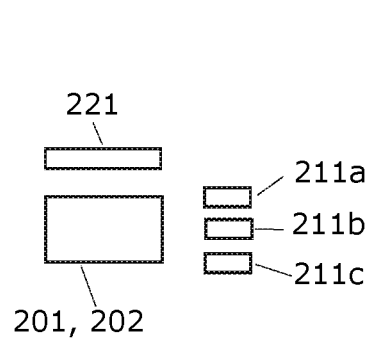
FIGS. 3B-C show different configurations of the control system.

FIG. 3B illustrates a possibly configuration of the control system 301 with one controller 202 which in this case also constitutes the control unit 201. Thus, the single controller 202 serves both the function of the control unit 201 as well as the functions of the one or more controllers 202a-e. Thus the monitoring of the contact interface 221 and detection of connections with the programming enabling keys 222 is performed by the controller 202. One or more of the data storage units 211a-c may be associated with the controller 202.

Figure 3C:
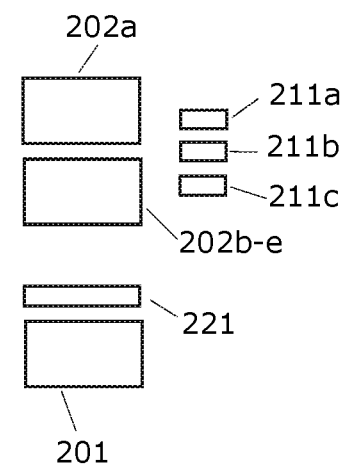

FIG. 3C shows a general configuration of the control system 301 with one or more controllers 202a-b, the connection interface 221, the control unit 201 and one or more data storage units 211a-c. For example, two data storage units 211a-b may be associated with a single controller 202a, and one data storage unit 211c may be associated with one or possible a plurality of controllers 202b-e.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A control system for a wind turbine, the wind turbine comprises at least one controller arranged to control a function of the wind turbine, and a data storage unit arranged to store controller specific data for the at least one controller, where the data storage unit is associated with the at least one controller to enable communication of the controller specific data between the data storage unit and the at least one controller, the control system comprises:
   a connection interface arranged to connect with a programming enabling key dependent on a presence of the programming enabling key in proximity of the connection interface, and
   a control unit separate from the at least one controller and the data storage unit, the control unit arranged to detect the connection between the programming enabling key and the connection interface, and in response to the detection, to initiate a programming mode wherein the control unit is enabled to process controller specific data or wind turbine specific data from which the controller specific data can be determined so that the controller specific data or wind turbine specific data is stored in the data storage unit, and wherein the control unit remains in the programming mode until the connection between the programming enabling key and the connection interface is lost.

2. The control system according to claim 1, wherein the connection interface is arranged to connect with the programming enabling key dependent on a contact or wireless communication between the programming enabling key and the connection interface.

3. The control system according to claim 1, wherein the control unit comprises a user interface or is connectable with a user interface, where the user interface is arranged to receive the controller specific data or the wind turbine specific data via a manual action.

4. The control system according to claim 1, wherein the control unit comprises a data interface or is connectable with a data interface, where the data interface is arranged to receive the controller specific data or the wind turbine specific data via a connection with a trusted data source.

5. The control system according to claim 1, wherein the control unit is configured to be set to a pre-programming mode which enables the control unit to detect the connection between the connection interface and the programming enabling key.

6. The control system according to claim 5, wherein the control unit is arranged to bring the wind turbine into a safe mode when the control unit is in the pre-programming mode.

7. The control system according to claim 1, wherein the data storage unit is configured as a detachable data storage unit so that the communication of data between the data storage unit and the at least one controller is only possible when the data storage unit is connected with the at least one controller.

8. The control system according to claim 1, wherein the controller specific data comprises operational parameters which are required for processing of controller specific computer programs installed in the at least one controller.

9. The control system according to claim 1, wherein the control unit is arranged to communicate controller specific computer programs to the at least one controller before the control unit is enabled to initiate the programming mode.

10. The control system according to claim 9, wherein the control unit is arranged to communicate the controller specific computer programs to the at least one controller dependent on identification data pre-stored in the data storage unit.

11. The control system according to claim 1, wherein the wind turbine comprises a plurality of data storage units, where each data storage unit of the plurality of data storage units is associated with a specific controller of the at least one controller to enable communication of the controller specific data between the associated data storage unit and the specific controller.

12. A method for configuring a wind turbine, the wind turbine comprises at least one controller arranged to control a function of the wind turbine, and a data storage unit arranged to store controller specific data for the at least one controller, where the data storage unit is associated with the at least one controller to enable communication of the controller specific data between the data storage unit and the at least one controller, the method comprises:
   detecting a connection between a programming enabling key and a connection interface dependent on a presence of the programming enabling key in proximity of the connection interface,
   in response to the detection, initiating a programming mode wherein a control unit separate from the at least one controller and the data storage unit is enabled to process controller specific data or wind turbine specific data from which the controller specific data can be determined so that the controller specific data or wind turbine specific data is stored in the data storage unit, and wherein the control unit remains in the programming mode until the connection between the programming enabling key and the connection interface is lost, and
   obtaining the controller specific data or the wind turbine specific data via a manual action or via a trusted data source.

13. A wind turbine, comprising:
a tower;
a nacelle disposed on the tower;
a rotor extending from the nacelle and having a plurality of blades disposed on a distal end thereof;
at least one controller arranged to control a function of the wind turbine;
a data storage unit arranged to store controller specific data for the at least one controller, where the data storage unit is associated with the at least one controller to enable communication of the controller specific data between the data storage unit and the at least one controller; and
a control system, comprising:
   a connection interface arranged to connect with a programming enabling key dependent on a presence of the programming enabling key in proximity of the connection interface, and
   a control unit separate from the at least one controller and the data storage unit, the control unit arranged to detect the connection between the programming enabling key and the connection interface, and in response to the detection, to initiate a programming mode wherein the control unit is enabled to process controller specific data or wind turbine specific data from which the controller specific data can be determined so that the controller specific data or wind turbine specific data is stored in the data storage unit, and wherein the control unit remains in the programming mode until the connection between the programming enabling key and the connection interface is lost.

14. The wind turbine according to claim 13, wherein each data storage unit is physically connected to a specific location of the wind turbine.

15. The wind turbine according to claim 13, wherein the control unit is arranged to process the controller specific data or wind turbine specific data so that the controller specific data or wind turbine specific data is stored in the storage unit.

16. The wind turbine according to claim 13, wherein the connection interface is arranged to connect with the programming enabling key dependent on a contact and/or wireless communication between the programming enabling key and the connection interface.

17. The wind turbine according to claim 13, wherein the control unit comprises a user interface or is connectable with a user interface, where the user interface is arranged to receive the controller specific data or the wind turbine specific data via a manual action.

* * * * *